United States Patent [19]
Evangelista

[11] 3,817,190
[45] June 18, 1974

[54] COLLAPSIBLE TRAY WITH ADAPTABLE HOOK ARRANGEMENT

[76] Inventor: Helen Evangelista, 2190 MacKay Ave., Fort Lee, N.J. 07024

[22] Filed: Feb. 13, 1973

[21] Appl. No.: 332,106

[52] U.S. Cl. ............................................. 108/44
[51] Int. Cl. ..................... A47b 23/00, A47b 37/00
[58] Field of Search .................. 108/44, 45, 46, 47; 248/302, 311–314, 214, 215, 102, 489, 490; 211/81, 88, 90, 104; 16/87.2

[56] References Cited
UNITED STATES PATENTS

| | | | |
|---|---|---|---|
| 792,492 | 6/1905 | Braubach | 248/215 |
| 1,226,231 | 5/1917 | Mack | 211/88 |
| 1,571,564 | 2/1926 | Walliser | 248/493 X |
| 1,965,955 | 7/1934 | De Foe et al. | 108/46 |
| 2,241,309 | 5/1944 | Kovalik | 208/25 X |
| 2,451,554 | 10/1948 | Medstrom | 248/493 X |
| 2,459,443 | 1/1949 | Mabry | 108/44 |
| 3,228,577 | 1/1966 | Croft | 248/309 |
| 3,229,946 | 1/1966 | MacKay | 108/46 |
| 3,465,893 | 9/1969 | Kinney | 248/215 X |
| 3,643,606 | 2/1972 | Vise | 108/44 |
| 3,712,235 | 1/1973 | Russ | 108/46 |

FOREIGN PATENTS OR APPLICATIONS

| | | | |
|---|---|---|---|
| 50,920 | 5/1941 | France | 108/46 |
| 214,541 | 5/1957 | Australia | 108/46 |

Primary Examiner—Paul R. Gilliam
Attorney, Agent, or Firm—Flynn & Faishauf

[57] ABSTRACT

A collapsible tray having an adaptable hook or suspension arrangement includes first and second tray members which are hingedly coupled together along one edge thereof and which are further flexibly coupled at at least one end thereof by means of a flexible cord member which supports the first tray member in a substantially horizontal position when the tray is in its operable or open state. The hook or suspension arrangement includes hook or suspension member which is preferably a thin, substantially flat member, and an additional flexible cord coupling the hook member to the second tray member, the second tray member being substantially vertical in use. The flexible cord coupling the hook member to the second tray member substantially conforms to the surface from which the tray is suspended, especially when used with an automobile or other motor vehicle and when the tray is suspended from the door thereof.

6 Claims, 5 Drawing Figures

PATENTED JUN 18 1974 3,817,190

COLLAPSIBLE TRAY WITH ADAPTABLE HOOK ARRANGEMENT

This invention relates to a collapsible tray, and more particularly to a collapsible tray having a flexible hook or suspension arrangement which conforms to the shape of the object from which the tray is suspended.

The present invention is particularly suitable for use in an automobile, or other motor vehicle, and the invention is described in detail in connection with such a use. However, it should be clear that the invention may be used in connection with any type of support structure, as desired.

An object of the present invention is to provide a collapsible tray, for example for holding food and/or drinks, which is simple in construction, easily maintained and which is collapsible to a small size for easy storage.

A further object of the invention is to provide such a collapsible tray having a support arrangement which enables the tray to be suspended from various types of support devices having various different contours, the support arrangement being simple, reliable, easy to use and inexpensive to manufacture.

SUMMARY OF THE INVENTION

In accordance with the present invention, a collapsible tray includes first and second hingedly coupled tray members which are flexibly coupled at at least one end thereof by means of a flexible cord member which supports the tray members in predetermined positions when the tray is in its operable or open state. A hook or suspension member is (hereinafter referred to as "hook" member) coupled to the tray member which is substantially vertical in use by means of an additional flexible cord member which is adapted to substantially conform to the surface from which the tray is suspended.

DETAILED DESCRIPTION OF PREFERRED EMBODIMENT

Figure 1:
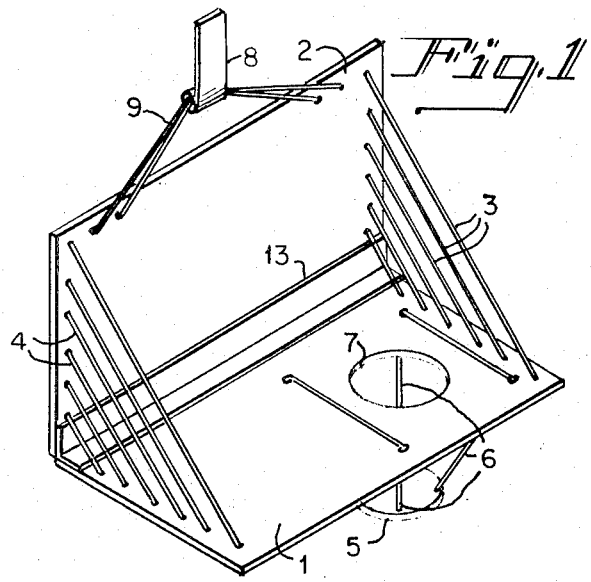
FIG. 1 is a perspective view in the operative state of a tray in accordance with the present invention.
Figure 5:
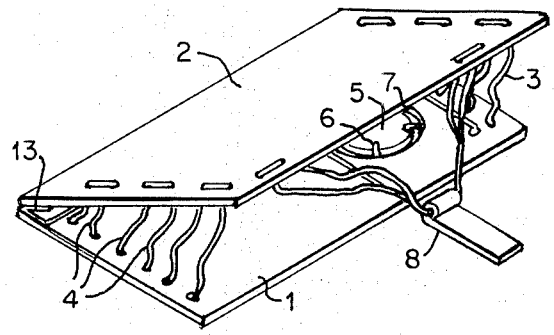
FIG. 5 illustrates the tray of FIG. 1 being folded toward its folded state.
Figure 3:
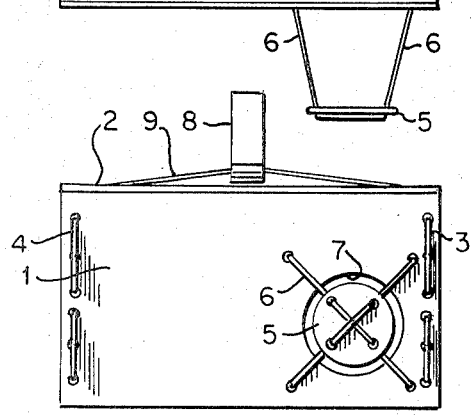
FIG. 3 is a bottom view of the the tray of FIG. 1 in the open position.

Referring to FIG. 1, the collapsible tray of the present invention is shown in its opened state. The tray comprises a bottom tray member 1 which is hingedly connected to a rear member 2, which is substantially vertically oriented, by means of a hinge 13. The hinge 13 may comprise a heavy duty cloth tape type hinge, or any other type of hinge, such as a plastic sheet material or conventional hinge. The tray member 1 is further coupled to the rear member 2 by means of cords 3 and 4 which, when the tray is in the operative state, support the tray portion 1 in the substantially horizontal position. The cords 3 and 4 may be any type of cord or cable having the necessary strength to support the tray 1. If desired, chains may also be used. The number of cords or cables is unimportant, as long as sufficient support strength is provided. If desired, only a single cord, string, chain or the like could be used on each side of the tray 1. The main requirement of the cords 3 and 4 is that they be flexible so that the tray portion 1 can be folded substantially flat against the vertical back member 2 as shown in FIG. 5, and that they have sufficient support strength.

Suspended from the tray portion 1 is a cup holder 5 which is flexibly coupled to the tray portion 1 by means of additional cords 6. The cords 6 are substantially the same as the cords 3 and 4 and may comprise any type of flexible cord member having sufficient tensile strength to insure that the cup support member 5 can adequately support a cup without breaking. The tray portion 1 has a hole 7 formed therein in registration with the cup support 5 through which a cup, bottle, or the like is inserted and supported at its bottom by cup support 5.

Figure 4:
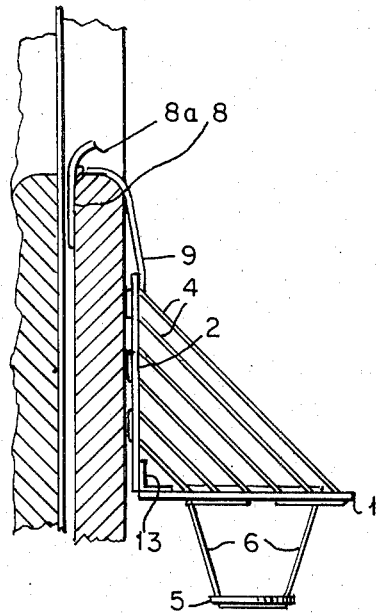
FIG. 4 is a side view of the opened tray of FIG. 1 illustrating the use of the hook member for securing the tray to an automobile door.
Figure 2:
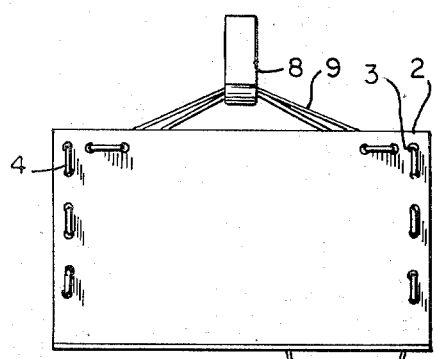
FIG. 2 is a rear view of the tray of FIG. 1 in the open position.

A hook member 8 is secured to the rear member 2 by means of cords 9 which are flexible and which have sufficient tensile strength to insure proper support of the tray, even when the tray is carrying a load. The cords 9 are flexible and conform to the curvature of the member to which the collapsible tray of the present invention is attached. When the invention is used with an automobile door, as shown in FIG. 4, the hook member 8 is inserted in the door between the inner door panel and the glass and the cords 9 are draped over the upper portion of the inner panel of the car door and conform with the curvature of the upper portion of the inner panel of the car door. In this position, the vertical rear member 2 lies substantially flat against the inner door panel. The forces applied to the hook member 8 via the cord 9 are in such a direction that the hook member 8 remains securely between the inner door panel and the glass so as to provide positive support for the tray.

The hook member 8 is preferably made of a substantially rigid thin material which may be inserted easily between the inner door panel and glass of an automobile or other road vehicle door. The hook member 8 is secured to the cord 9 such that there is no relative movement therebetween and so that the tray will always be supported with the tray member 1 in a level position. In a modified embodiment, additional hook member 8 are secured to the cord 9, and/or additional cords 9 are provided for support of a plurality of hook members 8. Portion 8a may be provided on hook member 8 for easy removal and to prevent hook 8 from being inserted too far into its supporting device, such as the car door. Portion 8a is only exemplary and other implementations such as a lip may be used.

The tray member 1 and rear member 2 may be made of any type of rigid or substantially rigid material, such as tempered hardboard (Masonite — one-eighth inch thick), plastic, metal, or the like. The members 1 and 2 may also be covered with a plastic material for easy maintenance. The members 1 and 2 may be made of layered material which results in a substantially rigid member. The cup support 5 may be made of any of the materials mentioned above with respect to members 1 and 2. Cup support 5 may also have a lip therearound to further prevent a cup or bottle from slipping off.

Likewise, the tray member 1 may have a raised lip therearound, if desired.

As seen in FIG. 5, the tray of the present invention is collapsible to a very flat, compact form and is easily stored, for example in the glove compartment of a vehicle. Due to the novel construction, the tray is effortlessly and quickly unfolded to its open or operative state and securely attached to the door of a vehicle. As mentioned above, the materials from which the elements of the invention are fabricated are varied and are not critical to the functioning of the invention.

The cords 3, 4, 6 and 9 are shown as being passed through holes in the members 1, 2 and 5 in a "sewn" type manner. This is a particularly convenient arrangement, but other means for securing the cords may be used. In the illustrated embodiment cords 3 are a single piece, as are cords 4, 6 and 9, respectively.

Many modifications and variations may be made to the tray of the present invention without departing from the scope thereof as set forth in the appended claims.

I claim:

1. A collapsible tray for use particularly in vehicles comprising:
    a first tray member;
    a second tray member hingedly coupled to said first tray member and adapted to be selectively foldable toward said first tray member;
    a third support member suspended from said first member in registration with said through hole therein by means of at least one flexible cord member;
    at least one flexible cord member coupling said first tray member to said second member so as to support said first tray member in a predetermined position relative to said second tray member when said tray is in the operable or open state;
    at least one suspension member having a first substantially rigid portion which is adapted to be inserted substantially downwardly between a pair of spaced, substantially vertically oriented support members; and
    at least one flexible elongated cord member coupling said at least one suspension member to said second tray member, said at least one flexible cord member being draped over and conforming to the shape of one of said support members when said suspension member is inserted between said support members.

2. A collapsible tray according to claim 1 wherein said suspension member is a substantially flat member.

3. The collapsible tray according to claim 1 wherein said pair of support members includes first and second portions of a vehicle door.

4. A collapsible tray according to claim 1 wherein said first and second members are foldable towards each other, said first, second and third members forming a substantially flat structure in the folded state.

5. A collapsible tray according to claim 1 comprising at least one flexible cord member coupling said first tray member to said second tray member at both ends thereof.

6. A collapsible tray according to claim 1 wherein said suspension member includes means thereon for preventing said suspension member from being inserted too far into a support device.

* * * * *